(12) United States Patent
Wood et al.

(10) Patent No.: US 12,353,805 B2
(45) Date of Patent: *Jul. 8, 2025

(54) ADAPTIVE FEM MESHING FOR ESTIMATING INTERNAL TEMPERATURE DISTRIBUTIONS WITHIN PARTS BEING MANUFACTURED VIA THE POWDER BED FUSION PROCESS

(71) Applicant: Ohio State Innovation Foundation, Columbus, OH (US)

(72) Inventors: Nathaniel Joseph Wood, Columbus, OH (US); David John Hoelzle, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 332 days.

This patent is subject to a terminal disclaimer.

(21) Appl. No.: 18/054,535

(22) Filed: Nov. 10, 2022

(65) Prior Publication Data

US 2023/0078543 A1 Mar. 16, 2023

Related U.S. Application Data

(63) Continuation-in-part of application No. 17/075,866, filed on Oct. 21, 2020, now Pat. No. 11,498,131.
(Continued)

(51) Int. Cl.
*G06F 30/23* (2020.01)
*B22F 10/80* (2021.01)
(Continued)

(52) U.S. Cl.
CPC .............. *G06F 30/23* (2020.01); *B22F 10/80* (2021.01); *B33Y 40/00* (2014.12); *B33Y 50/00* (2014.12);
(Continued)

(58) Field of Classification Search
CPC .. G06F 30/23; G06F 2113/10; G06F 2119/08; B22F 10/80; B22F 10/28;
(Continued)

(56) References Cited

U.S. PATENT DOCUMENTS 11,498,131 B2 * 11/2022 Wood ...................... B22F 10/28
2018/0304370 A1 * 10/2018 Myerberg .......... G05B 19/4099
2020/0341062 A1 * 10/2020 Wang ...................... H02P 23/14

OTHER PUBLICATIONS

Beckett, Darren, "In-Situ Process Mapping using Thermal Quality Signatures™ during Additive Manufacturing with Titanium Alloy Ti—6Al—4V", Sigma Labs, Apr. 9, 2018.
(Continued)

*Primary Examiner* — Michael J Brown
(74) *Attorney, Agent, or Firm* — Meunier Carlin & Curfman LLC

(57) ABSTRACT

Estimation algorithms, methods, and systems are provided that estimate the internal temperatures inside of a part being built using a Finite Element Method (FEM)-based thermal model of Powder Bed Fusion (PBF) heat transfer. Closed-loop state estimation is applied to the problem of monitoring temperature fields within parts during the PBF build process. The PBF laser is very small, therefore, so too are the FEM elements nearby the laser. Thus, as the PBF laser moves, a region of high mesh density moves along with it as it progresses over a geometry. In an aspect, regions of high mesh density are predetermined for each time step according to a predefined schedule of laser movements.

12 Claims, 6 Drawing Sheets

Related U.S. Application Data

(60) Provisional application No. 62/923,753, filed on Oct. 21, 2019.

(51) Int. Cl.
  B33Y 40/00    (2020.01)
  B33Y 50/00    (2015.01)
  B22F 10/28       (2021.01)
  B29C 64/153      (2017.01)
  B33Y 50/02       (2015.01)
  G06F 113/10      (2020.01)
  G06F 119/08      (2020.01)

(52) U.S. Cl.
  CPC ........... B22F 10/28 (2021.01); G06F 2113/10 (2020.01); G06F 2119/08 (2020.01)

(58) Field of Classification Search
  CPC ...... B22F 2999/00; B22F 10/85; B22F 12/90; B33Y 40/00; B33Y 50/00; B33Y 10/00; B33Y 50/02; B29C 64/153; B29C 64/393; B29C 64/386; Y02P 10/25
  USPC ........................................................ 700/117
  See application file for complete search history.

(56) References Cited

OTHER PUBLICATIONS

Bhavar, Valmik, et al. "A review on powder bed fusion technology of metal additive manufacturing." Additive manufacturing handbook (2017): 251-253.
Brandl, Erhard, et al. "Mechanical properties of additive manufactured titanium (Ti—6Al—4V) blocks deposited by a solid-state laser and wire." Materials & Design 32.10 (Dec. 2011): 4665-4675.
Chen, Linear system theory and design, 3rd ed. New York, NY: Oxford University Press, 1999.
Cverna, Fran, ed. ASM Ready Reference: Thermal properties of metals. ASM International, 2002.
DebRoy, Tarasankar, et al. "Additive manufacturing of metallic components-process, structure and properties." Progress in Materials Science 92 (Mar. 2018): 112-224. (Available online Oct. 7, 2017).
Denlinger, Erik R., et al. "Thermal modeling of Inconel 718 processed with powder bed fusion and experimental validation using in situ measurements." Additive Manufacturing 11 (Jul. 2016): 7-15.
Denlinger, Erik R., et al. "Thermomechanical model development and in situ experimental validation of the Laser Powder-Bed Fusion process." Additive Manufacturing 16 (Aug. 2017): 73-80.
Dullerud, et al., A Course in Robust Control Theory. Springer, 2000.
Dunbar, A. J., et al. "Development of experimental method for in situ distortion and temperature measurements during the laser powder bed fusion additive manufacturing process." Additive Manufacturing 12 (Oct. 2016): 25-30.
Evensen, Geir. "The ensemble Kalman filter: Theoretical formulation and practical implementation." Ocean dynamics 53.4 (2003): 343-367.
Franklin, Gene F., J. David Powell, and Michael L. Workman. Digital control of dynamic systems. vol. 3. Reading, MA: Addison-Wesley, 1998.
Gaikwad, Aniruddha, et al. "Toward the digital twin of additive manufacturing: Integrating thermal simulations, sensing, and analytics to detect process faults." IISE Transactions 52.11 (Jan. 24, 2020): 1204-1217.
Gillijns, Steven, and Bart De Moor. "Unbiased minimum-variance input and state estimation for linear discrete-time systems with direct feedthrough." Automatica 43.5 (Jan. 2007): 934-937.
Gokuldoss, Prashanth Konda, Sri Kolla, and Jürgen Eckert. "Additive manufacturing processes: Selective laser melting, electron beam melting and binder jetting-Selection guidelines." Materials 10.6 (Apr. 2017): 672.
Grasso, Marco, and Bianca Maria Colosimo. "Process defects and in situ monitoring methods in metal powder bed fusion: a review." Measurement Science and Technology 28.4 (Feb. 2017): 044005.
Heigel, J. C., P. Michaleris, and Edward William Reutzel. "Thermo-mechanical model development and validation of directed energy deposition additive manufacturing of Ti—6Al—4V." Additive manufacturing 5 (Jan. 2015): 9-19.
Keist, Jayme S., and Todd A. Palmer. "Role of geometry on properties of additively manufactured Ti—6Al—4V structures fabricated using laser based directed energy deposition." Materials & Design 106 (Sep. 2016): 482-494.
Kolossov, Serguei, et al. "3D FE simulation for temperature evolution in the selective laser sintering process." International Journal of Machine Tools and Manufacture 44.2-3 (Feb. 2004): 117-123.
Krol, T. A., et al. "Verification of structural simulation results of metal-based additive manufacturing by means of neutron diffraction." Physics Procedia 41 (Apr. 2013): 849-857.
Liu, Yi, and Brian DO Anderson. "Singular perturbation approximation of balanced systems." International Journal of Control 50.4 (1989): 1379-1405.
Marla, Deepak, Upendra V. Bhandarkar, and Suhas S. Joshi. "Models for predicting temperature dependence of material properties of aluminum." Journal of Physics D: Applied Physics 47.10 (Feb. 2014): 105306.
Megahed, M., Mindt, HW., Willems, J. et al. LPBF Right the First Time-the Right Mix Between Modeling and Experiments. Integr Mater Manuf Innov 8, 194-216 (Apr. 18, 2019). https://doi.org/10.1007/s40192-019-00133-8.
Mower, Todd M., and Michael J. Long. "Mechanical behavior of additive manufactured, powder-bed laser-fused materials." Materials Science and Engineering: A 651 (Jan. 2016): 198-213.
Mukherjee, Tridibesh, and Tarasankar DebRoy. "A digital twin for rapid qualification of 3D printed metallic components." Applied Materials Today 14 (Mar. 2019): 59-65. (Available online Nov. 17, 2018).
Parimi, Lakshmi L., et al. "Microstructural and texture development in direct laser fabricated IN718." Materials Characterization 89 (Mar. 2014): 102-111.
Peng, Hao, et al. "Fast prediction of thermal distortion in metal powder bed fusion additive manufacturing: Part 1, a thermal circuit network model." Additive Manufacturing 22 (Jun. 20, 2018): 852-868.
Peng, Hao, et al. "Fast prediction of thermal distortion in metal powder bed fusion additive manufacturing: Part 2, a quasi-static thermo-mechanical model." Additive Manufacturing 22 (Aug. 2018): 869-882.
Peralta, A. D., et al. "Towards rapid qualification of powder-bed laser additively manufactured parts." Integrating Materials and Manufacturing Innovation 5.1 (May 5, 2016): 154-176.
Peyre, P., et al. "Analytical and numerical modelling of the direct metal deposition laser process." Journal of Physics D: Applied Physics 41.2 (Jan. 2008): 025403.
Plati, A., et al. "Residual stress generation during laser cladding of steel with a particulate metal matrix composite." Advanced engineering materials 8.7 (Jul. 2006): 619-624.
Raghavan, A., et al. "Heat transfer and fluid flow in additive manufacturing." Journal of Laser Applications 25.5 (Aug. 2013): 052006.
Rich, Alan. "Shielding and guarding." Analog Dialogue 17.1 (1983): 8-13.
Ridwan, S., et al. "Automatic layerwise acquisition of thermal and geometric data of the electron beam melting process using infrared thermography." in Proceedings of the Annual International Solid Freeform Fabrication Symposium, Austin, TX, 2014, pp. 343-352.
Roberts, Ibiye Aseibichin, et al. "A three-dimensional finite element analysis of the temperature field during laser melting of metal powders in additive layer manufacturing." International Journal of Machine Tools and Manufacture 49.12-13 (Oct. 2009): 916-923.
Roger, C. R., S. H. Yen, and K. G. Ramanathan. "Temperature variation of total hemispherical emissivity of stainless steel AISI 304." JOSA 69.10 (1979): 1384-1390.

(56) References Cited

OTHER PUBLICATIONS

Rombouts, Marleen, et al. "Photopyroelectric measurement of thermal conductivity of metallic powders." Journal of Applied physics 97.2 (2005): 024905. [Online]. Available: https://doi.org/10.1063/1.1832740.

Samar, Raza, et al., "Model reduction with balanced realizations." International Journal of Control 62.1 (1995): 33-64.

Škatarić, Dobrila, and Nada Ratković-Kovaević. "The system order reduction via balancing in view of the method of singular perturbation." FME Transactions 38.4 (2010): 181-187.

Tóth, Roland, et al. "Crucial aspects of zero-order hold LPV state-space system discretization." IFAC Proceedings vols. 41.2 (Jul. 2008): 4952-4957.

Wang, T., et al. "Grain morphology evolution behavior of titanium alloy components during laser melting deposition additive manufacturing." Journal of Alloys and Compounds 632 (May 2015): 505-513.

Wei, H. L., J. W. Elmer, and T. DebRoy. "Origin of grain orientation during solidification of an aluminum alloy." Acta Materialia 115 (Aug. 2016): 123-131.

Wood, Nathaniel, and David Hoelzle. "Temperature states in Powder Bed Fusion additive manufacturing are structurally controllable and observable." arXiv preprint arXiv:2001.02519 (Jan. 7, 2020).

Wood, Nathaniel, and David J. Hoelzle. "On the feasibility of a temperature state observer for powder bed fusion additive manufacturing." 2018 Annual American Control Conference (ACC). IEEE, Jun. 27-29, 2018. pp. 321-328.

Wood, Nathaniel, et al. "Interrogation of mid-build internal temperature distributions within parts being manufactured via the powder bed fusion process." Proceedings of the 2019 Annual International Solid Freeform Fabrication Symposium. (Aug. 1, 2019).

Touloukian and D. DeWitt, Thermophysical Properties of Matter. IFI/Plenium, 1970, vol. 7, ch. 3, p. 1210.

Yadollahi, Aref, et al. "Effects of process time interval and heat treatment on the mechanical and microstructural properties of direct laser deposited 316L stainless steel." Materials Science and Engineering: A 644 (Sep. 2015): 171-183.

Yang, Zhuo, et al. "Investigating grey-box modeling for predictive analytics in smart manufacturing." ASME 2017 International Design Engineering Technical Conferences and Computers and Information in Engineering Conference. American Society of Mechanical Engineers Digital Collection, Aug. 6-9, 2017, Cleveland, Ohio, USA.

\* cited by examiner

ADAPTIVE FEM MESHING FOR ESTIMATING INTERNAL TEMPERATURE DISTRIBUTIONS WITHIN PARTS BEING MANUFACTURED VIA THE POWDER BED FUSION PROCESS

CROSS-REFERENCE TO RELATED APPLICATIONS

This application is a continuation-in-part of U.S. patent application Ser. No. 17/075,866, filed Oct. 21, 2020, entitled "Estimating Internal Temperature Distributions within Parts being Manufactured via the Powder Bed Fusion Process," and claims the benefit of U.S. Provisional Patent Application No. 62/923,753, filed on Oct. 21, 2019, entitled "Algorithm for Estimating Internal Temperature Distributions within Parts being Manufactured via the Powder Bed Fusion Process," the disclosures of which are expressly incorporated herein by reference in their entireties.

STATEMENT OF GOVERNMENT SUPPORT

This invention was made with government support under IIP 1738723 awarded by the National Science Foundation (NSF). This invention was made with government support under C.N. RX9-OSU-20-5-AFRL2 awarded by the Air Force Research Laboratory (AFRL). The government has certain rights in the invention.

BACKGROUND

Additive Manufacturing (AM) processes are a diverse set of automated manufacturing processes which build three-dimensional components in a layer-by-layer fashion though the selective addition of material. This forming strategy allows for fabricating features such as internal channels or fine lattice works that would be impractical or impossible to produce with traditional manufacturing processes, as well as eliminating most overhead costs associated with production. Furthermore, components fabricated by AM typically exhibit mechanical properties that meet or exceed those found in traditionally-manufactured components.

A class of AM processes is known as powder bed fusion (PBF). PBF is a type of AM technology that builds parts in a layer-by-layer fashion out of a bed of metal powder via the selective melting action of a laser or electron beam heat source. The PBF process performs the layer-wise AM fabrication of components in three stages: 1) sweeping a thin (20-100 micron) layer of powder over a base of metal feedstock or previously applied powder, 2) selectively melting a pattern of desired geometry into the powder by application of a high-powered laser or electron beam, and 3) lowering the build platform in the z direction to accommodate a fresh layer of powder.

The PBF process is not without flaws. It is well-known that components manufactured with PBF display high levels of residual stresses, porosity, and anisotropy in material properties. These defects are a direct consequence of the temperature throughout the component, which is manifested by cooling rates within the component interior and which could theoretically be used as a basis for process monitoring and control. For example, temperature history influences metallurgic phase formation which in turn influences mechanical properties and corrosion resistance; a complete temperature history would enable one to predict phases composition at all locations in a part. However, commercial PBF machines typically operate in the absence of advanced process monitoring tools or feedback control based on these internal cooling rates because the operation of these tools is contingent on adequate sensing. Cooling rates are inferred from temperature measurements at the part surface, if the PBF system is equipped with the correct sensor, or not inferred at all; direct internal temperature measurements is not possible during the PBF process. Temperature sensing must be remote as a thermocouple cannot be placed on the surface being built. Most commercial systems have a thermocouple built in to the built plate for chamber temperature regulation, but the temperature at the melting plane is hundreds of degrees Kelvin higher than at the build plate. Some research-grade PBF tools and some commercial systems, such as the Concept Laser M2, monitor the melt pool using a digital camera based pyrometer with an optical path that is concentric with the laser beam using sophisticated optics. Other commercial systems and a multitude of research PBF tools have used global-view digital camera based pyrometers to thermally image the top surface. Regardless of temperature sensing mode, thermal sensing is remote and, at present, there are no ways to measure temperature past the top layer being built; the sensing limitation is simple, fused metal is opaque to infrared transmission.

The application of thermal model-based process monitoring and control techniques could help detect and mitigate defects in the PBF process. Process monitoring suites offered by commercial PBF systems typically assess the presence of defects based on exhaustive calibrations that "train" the model to accept certain measured values as defect-free. Predictive model-based process monitoring with a minimum of necessary calibration remains elusive. Moreover, the demand is growing for closed loop process monitoring and control in PBF systems to replace the open loop architectures that exist today.

It is with respect to these and other considerations that the various aspects and embodiments of the present disclosure are presented.

SUMMARY

Estimation algorithms, methods, and systems are provided that estimate the internal temperatures inside of a part being built using powder bed fusion (PBF). Closed-loop state estimation is applied to the problem of monitoring temperature fields within parts during the PBF build process. A simplified linear time-invariant (LTI) model of PBF thermal physics with the properties of stability, controllability and observability is presented. In some aspects, an Ensemble Kalman Filter is applied to the model. Linear time-varying (LTV) systems are also contemplated.

In an implementation, a method of estimating the temperature distribution inside a part manufactured by powder bed fusion is provided. The method comprises: discretizing the part geometry into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; estimating the values of the variable set using a Kalman filter, using the set of ordinary differential equations, information on heat applied, an estimate of a noise distribution of the process, a measurement of a temperature of the part during the process at specific locations, and an estimate of a noise distribution in the temperature measurement; and outputting an estimate of the set of variables.

In an implementation, a method of estimating the temperature distribution inside a part manufactured by powder bed fusion is provided. The method comprises: discretizing the part geometry into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; constructing a set of copies of the set of ordinary differential equations with independent process and measurement noise distributions; estimating the values of the variable set and noise distributions of process and temperature measurement by using an ensemble Kalman filter, using the set of ordinary differential equations, information on the heat applied, and a measurement of a temperature of the part during the process at specific locations; and pre-determining adaptive meshes for each time step according to a predefined schedule of laser movements of the power bed fusion process to move a region of high mesh density with the movements of the laser. A corresponding system is also disclosed herein.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
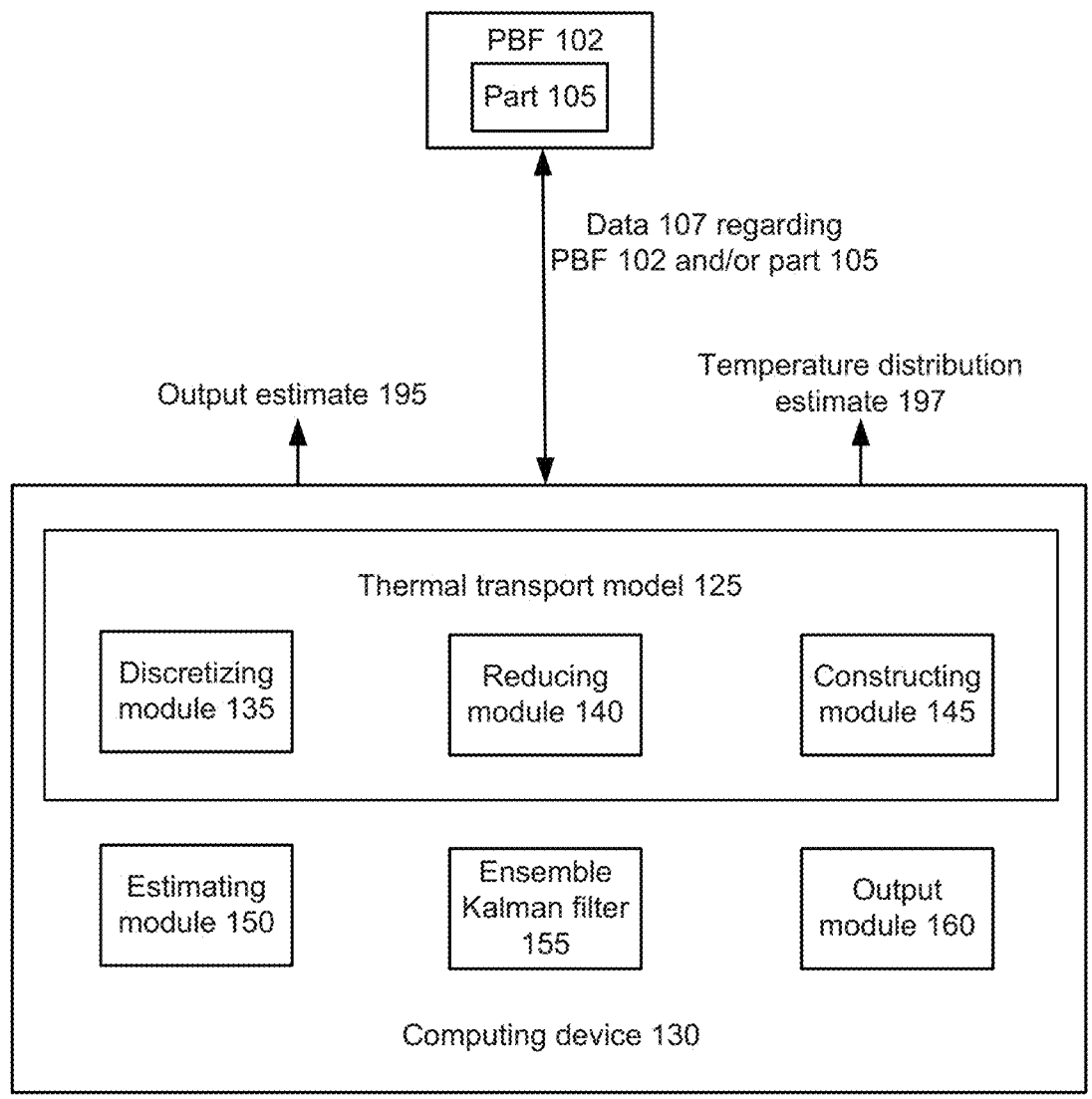
FIG. 1 is an illustration of an exemplary environment for estimating the temperature distribution inside a part manufactured by powder bed fusion.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Systems and methods are provided directed to predictive model-based process monitoring for power bed fusion (PBF). A linear time-invariant (LTI) state space model of PBF conductive heat transfer physics is described with established stability, controllability, and observability. This model is based on first principles and thus requires a minimum of training and/or calibration to perform. The model is reduced and expressed in discrete time, and a state estimator known as an ensemble Kalman filter (EnKF) is applied to the reduced-order model. Linear time-varying (LTV) systems are also contemplated. As with the LTI models, the LTV models are expressed in discrete time, but are not reduced prior to implementation of the EnKF.

A state observer is provided which estimates the time-varying surface and/or subsurface temperatures of components being manufactured via PBF. State observers belong to a class of algorithms which synthesize direct measurements of the available process inputs and outputs with a model which estimates the process states (which may be composed of measured and unmeasured states). This strategy forces the model predictions to conform to the measured system behavior and thus improves the prediction accuracy. Systems and methods described herein use the sub-class of state observers known as ensemble Kalman filters. Kalman filters acknowledge the reality that all processes involve some level of uncertainty and that this uncertainty produces model error which may be characterized with statistics, and therefore perform the state observer model/data prediction synthesis with statistical tools. An advantage provided by the EnKF is using sample statistics to avoid needing a priori knowledge of the system uncertainty statistics. Systems and methods described herein use a structure of the EnKF in order to accommodate uncertainty in PBF process inputs and incorporate the EnKF operation into the contexts of models of PBF thermal physics which are generated from finite element software. A filter algorithm described herein is designed to be integrated into a physical PBF system so that the model predictions may be used to accomplish process monitoring and control during the manufacture of components.

Several commercial applications are envisioned for the systems and methods described herein. An implementation is a signal processing tool that increases the utility of integrating additional sensing equipment into commercial PBF systems. As such, the systems and methods could be used by thermal camera manufacturers, who provide the sensing equipment, or by PBF manufacturers, who provide the PBF systems, to provide quality control and validation. For example, the temperature predictions supplied by the systems and methods could be used to predict microstructures, identify out-of-specification features (i.e., a type of fault detection scheme), or integrate into closed loop feedback systems. The systems and methods could also be used in a fault detection scheme in which temperature estimates that significantly deviate from the measured value would indicate the presence of defects, allowing the manufacturer to identify parts to be scrapped, or even better, abort a build early process to save manufacturing costs.

FIG. 1 is an illustration of an exemplary environment 100 for estimating the temperature distribution inside a part 105 manufactured by powder bed fusion 102. The environment 100 may include the PBF 102 manufacturing, the part 105 and a computing device 130. The computing device 130 may comprise a thermal transport model 125. The computing device 130 and the PBF 102 may be directly connected to one another or may be comprised within the same unit or system. In some implementations, the computing device 130 and the PBF 102 may be in communication through a network 120. The network 105 may be a variety of network types including the public switched telephone network (PSTN), a cellular telephone network, and a packet switched network (e.g., the Internet). Although only one PBF 102 and one computing device 130 are shown in FIG. 1, there is no limit to the number of PBFs and computing devices that may be supported.

The computing device 130 may be implemented using a variety of computing devices such as desktop computers, laptop computers, tablets, etc. Other types of computing devices may be supported. A suitable computing device is illustrated in FIG. 13 as the computing device 1300.

The PBF 102 is configured to manufacture the part 105, and provide data 107 regarding the PBF 102 and/or the part 105 to the computing device 130 for use in processing and estimation as described further herein.

The computing device 130 uses the data 107 and the thermal transport model 125 to generate one or more outputs, such as an output estimate 195 and/or a temperature distribution estimate 197, as described further herein. The one or more outputs may be provided from the computing device 130 to the client device 110 and/or the PBF 102, depending on the implementation.

The computing device 130 comprises various modules including a discretizing module 135, a reducing module 140, a constructing module 145, an estimating module 150, an ensemble Kalman filter 155, and an output module 160. In some implementations, the discretizing module 135, the reducing module 140, and the constructing module 145 are comprised within the thermal transport model 125.

The discretizing module 135 is configured to discretize a geometry of the part 105 into finite units to convert the thermal transport model 125 for the part geometry into a set of ordinary differential equations that describes heat transport between elements. In an implementation, the discretizing defines a set of variables that represent temperature at specific spatial locations, using the thermal transport model 125 and thermal properties of the part 105 material as functions in the set of ordinary differential equations. These aspects are described further below.

The reducing module 140 is configured to reduce the number of ordinary differential equations in the set of ordinary differential equations via a change in variables of the ordinary differential equations as a linear combination of the set of variables, thus providing a transformed variable set. These aspects are described further below.

The constructing module 145 is configured to, in some implementations, construct a set of copies of the reduced set of ordinary differential equations with independent application of input and measured noise distribution. These aspects are described further below.

The estimating module 150 is configured to estimate the values of the transformed variable set using a Kalman filter, such as the ensemble Kalman filter 155, using the reduced set of ordinary differential equations, information on heat applied, an estimate of a noise distribution of the process, a measurement of a temperature of the top surface of the part 105 during the process at specific locations, and an estimate of a noise distribution in the temperature measurement. The estimating module 150 is also configured to compute an estimate of the set of variables by reversing the reduction of the number of ordinary differential equations. In the case of an LTV system, no reduction is applied, and the variable set is untransformed.

In some implementations, the estimating module 150 is configured to estimate the values of the transformed variable set and noise distributions of process and temperature measurement by using an ensemble Kalman filter, using the reduced set of ordinary differential equations, information on the heat applied, and a measurement of a temperature of the part during the process at specific locations. The estimating module 150 is also configured to compute an estimate of the set of variables and noise by reversing the reduction of the number of ordinary differential equations. In the case of an LTV system, no reduction is applied, and the variable set is untransformed. Aspects are described further below.

The output module 160 is configured to provide the output estimate 195 and/or a temperature distribution estimate 197 to an output device, such as an output device of the computing device 130. It is noted that the output estimate 195 differs from the temperature distribution estimate 197. The output estimate 195 is the estimate of the sensor value, as predicted by the output module 160. This is not the same as an estimation of the temperature distribution or even a subset of it. Depending on the implementation of the sensor choice, the sensor physical model, and the sensor operation, the output estimate 195 and the temperature distribution estimate 197 may have different units.

Figure 2:
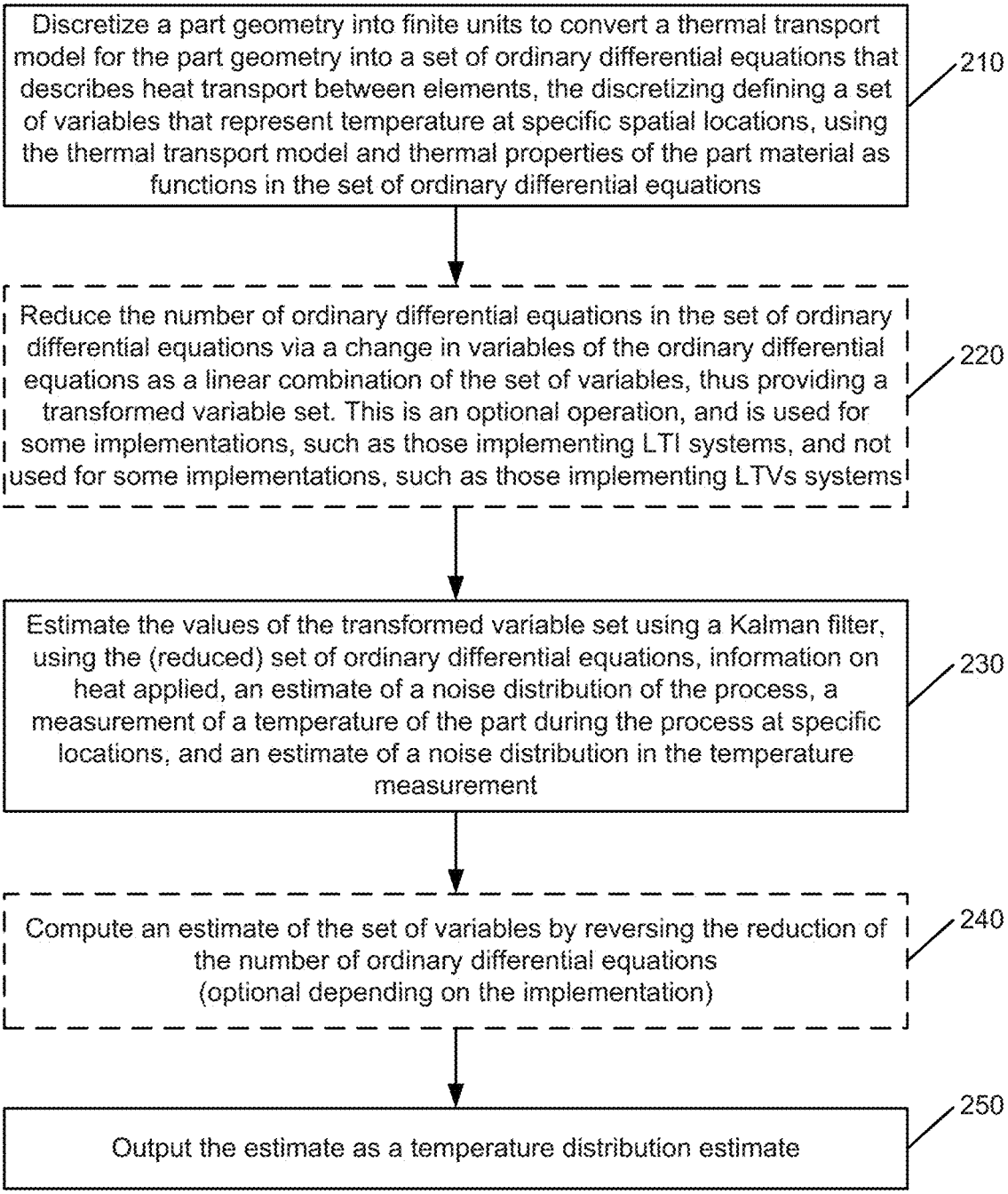
FIG. 2 is an operational flow of an implementation of a method of estimating the temperature distribution inside a part manufactured by powder bed fusion.

FIG. 2 is an operational flow of an implementation of a method 200 of estimating the temperature distribution inside a part manufactured by powder bed fusion. The method 200 may be performed using the environment 100 in some implementations.

At 210, using the discretizing module 135, discretize a part geometry into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations.

Optionally, in some implementations, at 220, using the reducing module 140, reduce the number of ordinary differential equations in the set of ordinary differential equations via a change in variables of the ordinary differential equations as a linear combination of the set of variables, thus providing a transformed variable set. This operation is optional depending on the implementation, as some implementations do not reduce the number of variables.

At 230, using the estimating module 150, estimate the values of the transformed variable set using a Kalman filter (e.g., from the ensemble Kalman filter 155), using the (reduced, in some implementations) set of ordinary differential equations, information on heat applied, an estimate of a noise distribution of the process, a measurement of a temperature of the part during the process at specific locations, and an estimate of a noise distribution in the temperature measurement.

Optionally (e.g., in the implementations in which the operations at 220 are performed), at 240, using the estimating module 150, compute an estimate of the set of variables by reversing the reduction of the number of ordinary differential equations. This operation is optional depending on the implementation, because if the reduction of 220 is not performed, then there is no reduction to be reversed.

At 250, using the output module 160, output the estimate as a temperature distribution estimate, such as the temperature distribution estimate 197.

Figure 3:
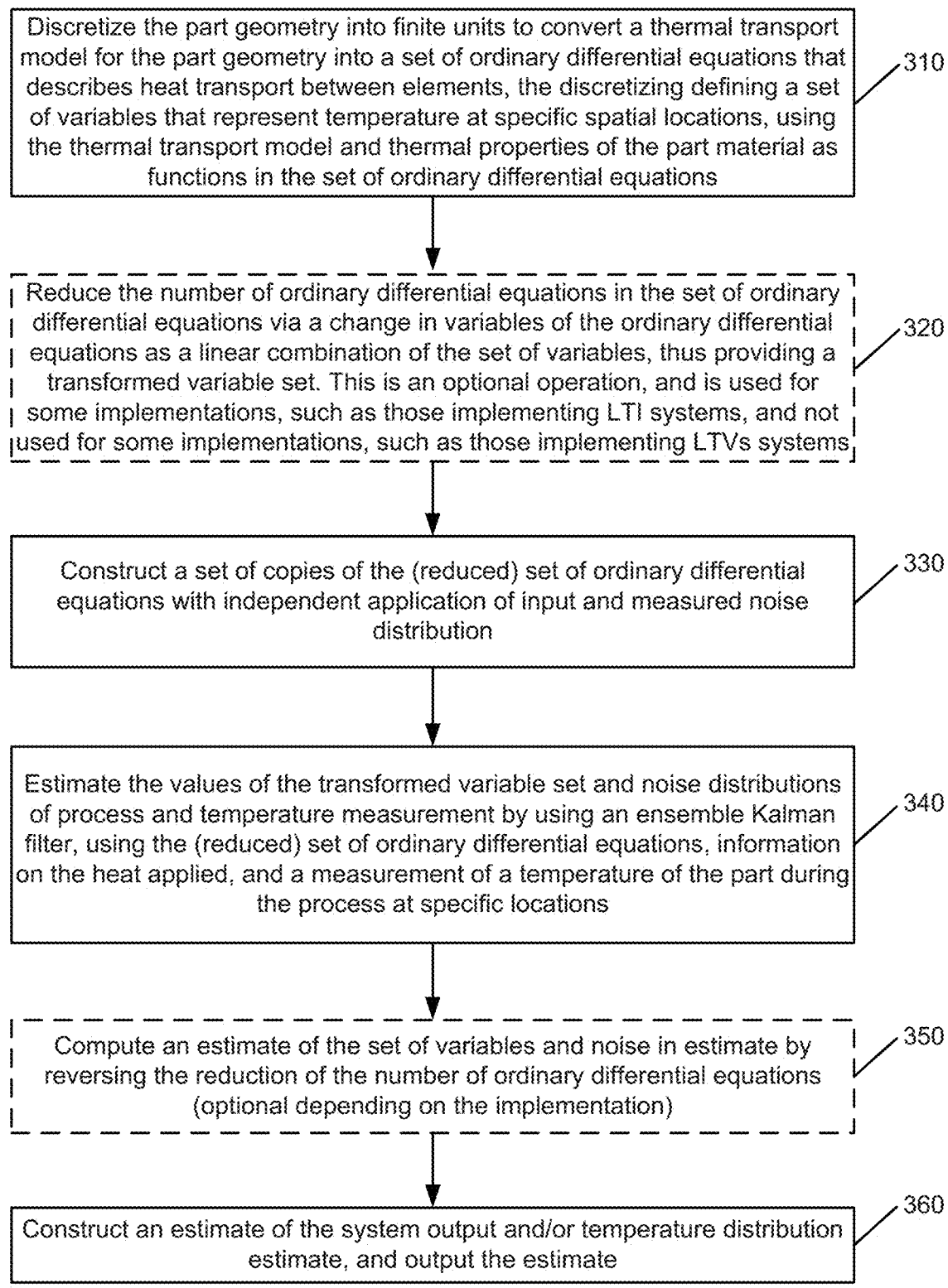
FIG. 3 is an operational flow of another implementation of a method of estimating the temperature distribution inside a part manufactured by powder bed fusion.

FIG. 3 is an operational flow of another implementation of a method 300 of estimating the temperature distribution inside a part manufactured by powder bed fusion. The method 300 may be performed using the environment 100 in some implementations.

At 310, using the discretizing module 135, discretize the part 105 geometry into finite units to convert a thermal transport model 125 for the part geometry into a set of ordinary differential equations that describes heat transport between elements, the discretizing defining a set of variables that represent temperature at specific spatial locations, using the thermal transport model and thermal properties of the part material as functions in the set of ordinary differential equations.

Optionally, in some implementations, at 320, using the reducing module 140, reduce the number of ordinary differential equations in the set of ordinary differential equations via a change in variables of the ordinary differential equations as a linear combination of the set of variables, thus providing a transformed variable set. This operation is optional depending on the implementation, as some implementations do not reduce the number of variables.

At 330, using the constructing module 145, construct a set of copies of the (reduced, in some implementations) set of ordinary differential equations with independent application of input and measured noise distribution.

At 340, using the estimating module 150, estimate the values of the transformed variable set and noise distributions of process and temperature measurement by using the ensemble Kalman filter 155, using the (reduced, in some implementations) set of ordinary differential equations, information on the heat applied, and a measurement of a temperature of the part during the process at specific locations.

Optionally (e.g., in the implementations in which the operations at 320 are performed), at 350, using the estimating module 150, compute an estimate of the set of variables and noise by reversing the reduction of the number of ordinary differential equations. This operation is optional depending on the implementation, as some implementations do not reduce the number of variables.

At 360, using the output module 160, construct an estimate of the system output and/or temperature distribution estimate (such as the temperature distribution estimate 197), and output the estimate(s).

An implementation of a computational algorithm of estimating the temperature distribution inside a part either being or was manufactured by powder bed fusion comprises: providing a computer model of the part geometry; providing a thermal transport model of heat and temperature both internal and external to the part domain; providing thermal properties of the part material; providing information on the heat applied to the top surface of the part during the process; providing an estimate of the noise distribution of the process; providing a measurement of the temperature of the part during the process at specific locations; providing an estimate of the noise distribution in the temperature measurement; discretization of the computer model of the part geometry into finite units to convert the thermal transport model for the part geometry into a set of ordinary differential equations that describes heat transport between elements, the discretization defining an original set of variables that represent temperature at specific spatial locations, using the thermal transport model and thermal properties of the part material as the underlying functions in the set of ordinary differential equations; reduction of the number of ordinary differential equations in the set of ordinary differential equations via a change in variables of the ordinary differential equations as a linear combination of the original variables in the set, thus providing a transformed variable set; estimation of the values of the transformed variable set by using a Kalman filter, using the provided reduced set of ordinary differential equations, information on the heat applied, estimate of the noise distribution of the process, measurement of the temperature of the part during the process at specific locations, and estimate of the noise distribution in the temperature measurement; and computing an estimate of the original set of variables by reversing the reduction of the number of ordinary differential equations. It is noted that in some implementations, such as LTV thermal transport models, no reduction occurs.

An implementation of a computational algorithm of estimating the temperature distribution inside a part either being or was manufactured by powder bed fusion comprises: providing a computer model of the part geometry; providing a thermal transport model of heat and temperature both internal and external to the part domain; providing thermal properties of the part material; providing information on the heat applied to the top surface of the part during the process; providing a measurement of the temperature of the part during the process at specific locations; discretization of the computer model of the part geometry into finite units to convert the thermal transport model for the part geometry into a set of ordinary differential equations that describes heat transport between elements, the discretization defining an original set of variables that represent temperature at specific spatial locations, using the thermal transport model and thermal properties of the part material as the underlying functions in the set of ordinary differential equations; reduction of the number of ordinary differential equations in the set of ordinary differential equations via a change in variables of the ordinary differential equations as a linear combination of the original variables in the set, thus providing a transformed variable set; constructing a set of copies of the reduced set of ordinary differential equations with independent process and measurement noise distributions; estimation of the values of the transformed variable set and the noise distributions of process and temperature measurement by using an ensemble Kalman filter, using the provided reduced set of ordinary differential equations, information on the heat applied, and measurement of the temperature of the part during the process at specific locations; and computing an estimate of the original set of variables and noise in the estimate by reversing the reduction of the number of ordinary differential equations. It is noted that in some implementations, such as LTV thermal transport models, no reduction occurs.

In some implementations, when the ensemble Kalman filter is implemented, the noise distributions that are used (e.g., added to the implementation(s)) are not derived from a priori knowledge, from experiments, or from other tests. Instead, they are dummy values that are directed to a guess or estimate as to what the noise might be. These noise values may be represented by $\Pi$ and $\Sigma$ of an example EnKF algorithm provided further herein.

An implementation of a device for estimating the temperature distribution inside a part manufactured by powder bed fusion is provided. The device is configured to: discretize a geometry of the part into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; reduce the number of ordinary differential equations in the set of ordinary differential equations via a change in variables of the ordinary differential equations as a linear combination of the set of variables, thus providing a transformed variable set; estimate the values of the transformed variable set using a Kalman filter, using the reduced set of ordinary differential equations, information on heat applied, an estimate of a noise distribution of the process, a measurement of a temperature of the part during the process at specific locations, and an estimate of a noise distribution in the temperature measurement; and compute an estimate of the set of variables by reversing the reduction of the number of ordinary differential equations. It is noted that in some implementations, such as LTV thermal transport models, no reduction occurs.

An implementation of a device for estimating the temperature distribution inside a part manufactured by powder bed fusion is provided. The device is configured to: discretize a geometry of the part into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; reduce the number of ordinary differential equations in the set of ordinary differential equations via a change in variables of the ordinary differential equations as a linear combination of the set of variables, thus providing a transformed variable set; construct a set of copies of the reduced set of ordinary differential equations with independent process and measurement noise distributions; estimate the values of the transformed variable set and noise distributions of process and temperature measurement by using an ensemble Kalman filter, using the reduced set of ordinary differential equations, information on the heat applied, and a measurement of a temperature of the part during the process at specific locations; and compute an estimate of the set of variables and noise in estimate by reversing the reduction of the number of ordinary differential equations. It is noted that in some implementations, such as LTV thermal transport models, no reduction occurs.

An implementation of a system for estimating the temperature distribution inside a part manufactured by powder bed fusion comprises: a processing module configured to: discretize a geometry of the part into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; reduce the number of ordinary differential equations in the set of ordinary differential equations via a change in variables of the ordinary differential equations as a linear combination of the set of variables, thus providing a transformed variable set; construct a set of copies of the reduced set of ordinary differential equations with independent application of input and measured noise distribution; estimate the values of the transformed variable set and noise distributions of process and temperature measurement by using an ensemble Kalman filter, using the reduced set of ordinary differential equations, information on the heat applied, and a measurement of a temperature of the part during the process at specific locations; and compute an estimate of the set of variables and noise in estimate by reversing the reduction of the number of ordinary differential equations; and an output module configured to provide the estimate. It is noted that in some implementations, such as LTV thermal transport models, no reduction occurs.

In some implementations, the discretization of the volume is an adaptive mesh that changes over time in the model. In some implementations, the discretization is the finite element method. In some implementations, the discretization is the finite volume method. In some implementations, the discretization is the boundary element method. It is noted that an adaptive mesh does not preclude using finite elements.

In some implementations, the reduction of the number of ordinary differential equations is residualization. In some implementations, the reduction of the number of ordinary differential equations is balanced truncation. It is noted that in some implementations, like LTV systems, reduction cannot be done.

Some examples are now described. It is noted that these examples, and features and aspects therein, are for illustrative purposes only and the invention is not limited to these examples. Other implementations, such as those involving convection and radiation, may be used.

Regarding a PBF model, assumptions, and LTI construction, a simplified model of PBF thermal physics in which only Fourier conduction within the fused material is considered. The Fourier conduction boundary value problem (BVP) is stated in Equation (1):

$$\frac{\partial T}{\partial t} = \frac{K}{c\rho}\nabla^2 T \forall \xi \in V \qquad (1)$$

$$T = T_0 \forall \xi \in \Lambda$$

$$\nabla \cdot \hat{n} = 0 \forall \xi \in \Gamma$$

$$\nabla \cdot \hat{n} = q(\bar{\xi}, t) \forall \bar{\xi} \in \Omega.$$

K represents the material thermal conductivity, c represents the material specific heat, and ρ represents the material density. V represents the domain spanned by the (possibly unfinished) build, Λ collects all faces of the build in contact with the base plate, Ω collects all surfaces of the build exposed to the environment, and Γ collects all remaining faces. $T_0$ is the assumed-isothermal temperature of the base plate.

The BVP in Equation (1) is transformed into the linear state-space thermal model shown (a continuous LTI model) in Equation (2):

$$\dot{x}(t) = Ax(t) + Bu(t)$$

$$y(t) = Cx(t). \qquad (2)$$

A transformation is used to convert the partial differential equation (PDE) into a set of coupled ordinary differential equations (ODEs) via the Finite Element Method (FEM). Equation (2) is this set of ODEs. Each ODE governs the evolving temperature at a single node in the FEM mesh, and the system input is quantized to hold a constant value over each element surface belonging to Ω. In the thermal model of Equation (2), x collects the temperature signals at all nodes in the mesh, A maps the degree of conductive heat flow between nodes (0 for nonadjacent nodes), B maps the degree of distribution of laser energy input onto nodes located on $\Omega$, and C selects the nodes belonging to $\Omega$ as system output in keeping with the assumption that only exposed faces of the build are available for measurement.

The thermal model of Equation (2) is unconditionally stable, stabilizable, and detectable, and is both structurally controllable and observable provided that at least one node in the FEM mesh exists on the exposed build surface. In fact, the system is not only structurally controllable and observable under this condition, it is fully controllable and observable. Thus, so long as a single node in the FEM mesh lays on the uppermost surface, Equation (2) is fully controllable and observable, if all eigenvalues of A are distinct. u(t) represents a quantized heat input over the FEM element faces on the top surface, and y(t) measures temperatures on the top surface.

Regarding model order reduction via balanced realization, the thermal model of Equation (2) mitigates the problem of model scale when attempting to represent PBF physics on the macroscale; however, the quantization of the system heat input can produce cumbersome node counts and therefore system sizes. Model order reduction (MOR) is used to reduce the impact of these issues. In an implementation, MOR may be performed via residualization.

The residualization algorithm requires stability, controllability and observability of the system.

The algorithm begins by performing the linear state transformation) z(t)=Tx(t), which puts the system in its balanced realization. The user then selects the first r (largest) Hankel Singular Values (HSVs) of the system, which are demonstrated in Equation (3). Each HSV is $\sqrt{\lambda_i(W_c W_o)}$; $\lambda_i$ denotes the $i^{th}$ eigenvalue of a matrix, and $W_c$ and $W_o$ are the controllability and observability grammians, respectively.

$$W = \text{diag}(\sigma_1 \geq \sigma_2 \geq \ldots \geq \sigma_n \geq 0). \quad (3)$$

The balanced realization of Equation (2) z(t)=Tx(t) is constructed, and the transformed system is divided into two parts, based on the relative magnitude of the HSVs.

Partitioning the HSVs in this manner also partitions z into two groups: $z_1 \in \mathbb{R}^r$ which constitute the "dominant" modes in the system input/output dynamics, and $z_2 \in \mathbb{R}^{n-r}$ which constitute the negligible modes. The partitioned system takes the form shown in Equation (4):

$$\begin{bmatrix} \dot{z}_1(t) \\ \dot{z}_2(t) \end{bmatrix} = \begin{bmatrix} A_{11} & A_{12} \\ A_{21} & A_{22} \end{bmatrix} \begin{bmatrix} z_1(t) \\ z_2(t) \end{bmatrix} + \begin{bmatrix} B_{11} \\ B_{22} \end{bmatrix} u(t) \quad (4)$$

$$y(t) = [C_{11} \ C_{22}] \begin{bmatrix} z_1(t) \\ z_2(t) \end{bmatrix}.$$

The residualization algorithm assumes that the "weak" modes stored in $z_2$ operate at quasi-steady state. In other words, it assumes that on the time scales of interest, $\dot{z}_2 = 0$. Thus, residualization proceeds by assuming $\dot{z}_2(t) = 0$ for all $t \geq 0$. This assumption allows for the algebraic solution of $z_2$, which reduces Equation (4) to the form shown in Equation (5) (the reduced LTI system):

$$\dot{z}_1(t) = A_r z_1(t) + B_r u(t)$$

$$y(t) = C_r z_1(t) + D_r u(t)$$

$$z_2(t) = -A_{22}^{-1}(A_{21} z_1(t) + B_{22} u(t))$$

$$A_r = A_{11} - A_{12} A_{22}^{-1} A_{21}$$

$$B_r = B_{11} - A_{12} A_{22}^{-1} A_{21}$$

$$C_r = C_{11} - C_{22} A_{22}^{-1} A_{21}$$

$$D_r = -C_{22} A_{21}^{-1} B_{12}. \quad (5)$$

With residualization, one only needs to solve r coupled differential equations instead of n, and the original state x may be reconstituted during postprocessing by algebraically calculating $z_2$ and performing the inverse transformation $x = T^{-1}[z_1, z_2]'$. The (structural) controllability/observability of Equation (2) implies that Equation (5) is also (structurally) controllable and observable.

The state estimator design uses discretization of a continuous-time model. A Kalman filter is used to estimate the state of thermal model of Equation (2), which is implemented in discrete time.

In an implementation, a backward Euler discretization of the system is followed. Define discrete time steps as $t_k = k\Delta t$ for some fixed $\Delta t$. For notational convenience, $z_1(t_k) := z_{1,k}$. This discretization works by assuming:

$$\dot{z}_1(t_{k+1}) = \frac{z_{1,k+1} - z_{1,k}}{\Delta t}. \quad (6)$$

Equation (6) is substituted into Equation (2). With simplification, the following discrete-time system is obtained:

$$z_{1,k} = A_d z_{1,k-1} + B_d u_k$$

$$y_k = C_d z_{1,k} + D_d u_k$$

$$z_{2,k} = -A_{22}^{-1}(A_{21} z_{1,k} + B_{22} u_k)$$

$$A_d = (I - \Delta t A_r)^{-1}$$

$$B_d = \Delta t A_d B_r$$

$$C_d = C_r$$

$$D_d = D_r. \quad (7)$$

As $z_{1,k}$ (or its estimate) is computed, $z_{2,k}$ can be computed as a postprocessing step, or in parallel with the computation of $z_{1,k}$. They can be reassembled into $z_k = [z_{1,k}, z_{2,k}]'$. Once this is done, $x_k$ can be recovered with the transformation $x_k = T^{-1} z_k$.

In an implementation, an ensemble Kalman filter (EnKF) may be used. Effective implementation of a Kalman filter requires knowledge of the covariances of the process and measurement noise of the system under consideration. The state estimate covariance is denoted as P, and the measurement noise covariance is denoted as R. In some implementations, the model in Equation (7) is implementable for arbitrary build layer geometry V and under arbitrary external loading $q(\xi,t)$. These constraints make the prediction of P intractable, while also limiting the utility of experimentally determining P due to the near-infinite variety of allowable geometric and loading conditions.

To overcome this limitation, a means is used of approximating P and R in-situ from the measured data y and reconstructed state estimate $\hat{x}$. The Ensemble Kalman filter described further herein provides the optimal means of accomplishing this goal.

Within the context of reduced-order LTI systems, an implementation of an EnKF algorithm is as follows. An ensemble is generated:

$$Z_{1,k} = A_d \hat{Z}_{1,k-1} + B_d u_{k-1} 1_{1 \times N} + W_k; \ W_k = [w_k^1, \ldots, w_k^N],$$
$$w_k^i \sim N(0, \Pi)$$

$$Y_k = y_k 1_{1 \times N} + V_k; V_k = [v_k^1, \ldots, v_k^N], v_k^i \sim N(0, \Sigma) \quad (8)$$

It is noted that the Π and E are dummy noise values described further herein.

Sample noise statistics are gathered as follows:

$$\bar{z}_{1,k} = \frac{1}{N}Z_{1,k}1_{N\times 1}, \bar{y}_k = \frac{1}{N}Y_k 1_{N\times 1} \quad (9)$$

$$\bar{P}_k^f = \frac{1}{N-1}(Z_{1,k} - \bar{z}_{1,k}1_{1\times N})(Z_{1,k} - \bar{z}_{1,k}1_{1\times N})'$$

$$\bar{R}_k = \frac{1}{N-1}(Y_k - \bar{y}_k 1_{1\times N})(Y_k - \bar{y}_k 1_{1\times N})'.$$

A Kalman filter is run on the ensemble as follows:

$$\tilde{Y}_k = Y_k - C_d Z_{1,k-1} - D_d u_k 1_{1\times N} \quad (10)$$

$$S_{k|k-1} = C_d \bar{P}_k^f C_d' + \bar{R}_k$$

$$K_k = \bar{P}_k^f C_d' S_{k|k-1}^{-1}$$

$$\hat{Z}_{1,k} = Z_{1,k} + K_k \tilde{Y}_k$$

$$\hat{z}_{1,k} = \frac{1}{N}\hat{Z}_{1,k}1_{N-1}.$$

An implementation of an EnKF algorithm for an LTV embodiment is as follows. An ensemble is generated:

$$\hat{X}_{k|k-1} = A\hat{X}_{k-1|k-1} + B_k u_k 1_{1\times N} + J_k; J_k = [j_k^1, \ldots, j_k^N], j_k^i \sim N(0,\Pi)$$

$$Y_k = y_k 1_{1\times N} + O_k; O_k = [o_k^1, \ldots, o_k^N], o_k^i \sim N(0,\Sigma). \quad (11)$$

Sample noise statistics are gathered as follows:

$$\bar{x}_k = \frac{1}{N}\hat{X}_{k|k-1}1_{N\times 1}, \bar{y}_k = \frac{1}{N}Y_k 1_{N\times 1} \quad (12)$$

$$\bar{P}_k^f = \frac{1}{N-1}(\hat{X}_{k|k-1} - \bar{x}_k 1_{1\times N})(\hat{X}_{k|k-1} - \bar{x}_k 1_{1\times N})'$$

$$\bar{R}_k = \frac{1}{N-1}(Y_k - \bar{y}_k 1_{1\times N})(Y_k - \bar{y}_k 1_{1\times N})'.$$

A Kalman filter is run on the ensemble as follows:

$$\tilde{Y}_k = Y_k - C_k \hat{X}_{k|k-1} \quad (13)$$

$$S_{k|k-1} = C_k \bar{P}_k^f C_k' + \bar{R}_k$$

$$K_k = \bar{P}_k^f C_k' S_{k|k-1}^{-1}$$

$$\hat{X}_{k|k} = \hat{X}_{k|k-1} + K_k \tilde{Y}_k$$

$$\hat{x}_{k|k} = \frac{1}{N}\hat{X}_{k|k}1_{N\times 1}$$

Figure 4:
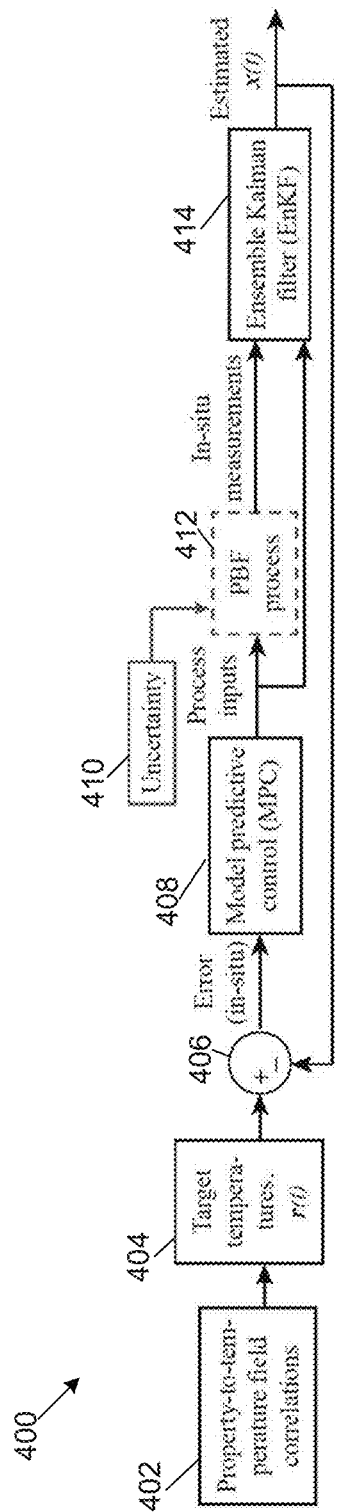
FIG. 4 illustrates an example application of Model Predictive Control (MPC) is in an Ensemble Kalman Filter (EnKF) based method.
Figure 5A:
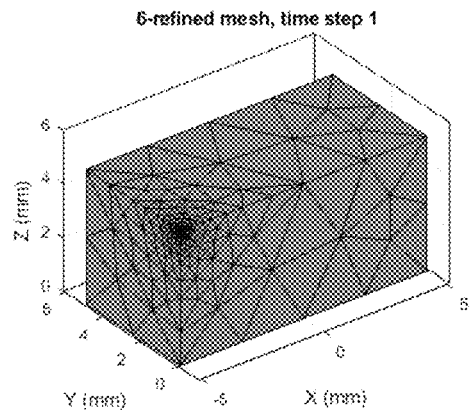
FIGS. 5A-5D illustrate representative examples of an adaptive mesh strategy as a powder bed fusion heat source progresses over a test geometry.
Figure 5B:
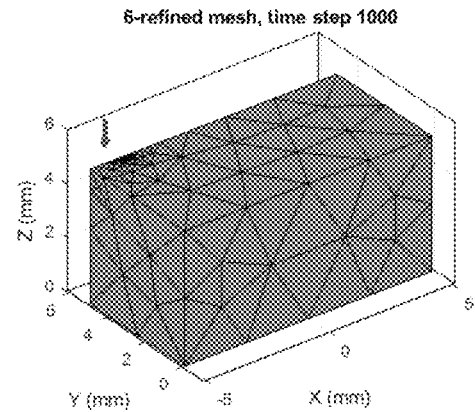
Figure 5C:
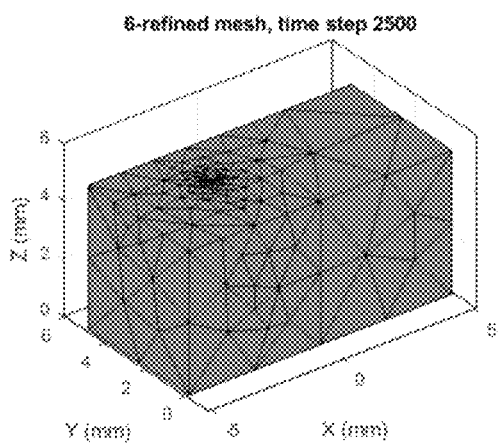
Figure 5D:
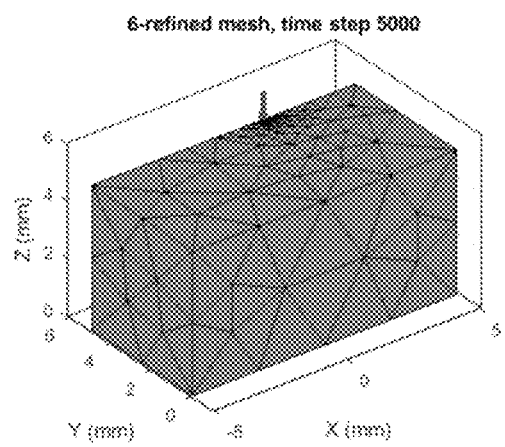

Model Predictive Control (MPC) is an expanded application of the Ensemble Kalman Filter (EnKF) methods described above. FIG. 4 illustrates an example of how MPC fits into the EnKF-based method 400 of estimating internal temperatures. As a recap, $x(t) \in \mathbb{R}^n$ represents the internal temperature field 402 in the part, discretized by the finite element method (FEM). Each component of $x(t)$ is the temperature of the corresponding node in the mesh. Since direct measurement of internal temperatures is impossible, the EnKF algorithm (414) supplies estimates of $x(t)$ at discrete time steps k, denoted $\hat{x}_{k|k}$ at 406. Presuming these estimates are accurate, the MPC component 408 uses them as a basis to alter the prescribed set of control inputs to the powder bed fusion (PBF) 412 machine in (quasi)-real time in view of uncertainty 410 in PBF process inputs. The control inputs are altered to perform corrective action, as necessary, so that $\hat{x}_{k|k}$ is driven towards some predetermined target temperature field (404), r(t). Like the EnKF, MPC requires a model of the process. It functions by forecasting the process behavior η time steps into the future, and performing joint optimization (with constraints) over the spaces of process states and process inputs to identify those inputs which drive $\hat{x}_{k|k}$ towards r(t) as rapidly as possible while obeying constraints and hyperparameter selection. Hereafter, the process inputs will be denoted u(t). The components of u(t) differ based on whether a linear time-invariant (LTI) or linear time-varying (LTV) process model is considered. The implementation of MPC for both process models will be described below.

Adaptive Meshing Algorithm

The EnKF algorithm discussed above is founded upon a Finite Element Method (FEM)-based thermal model of Powder Bed Fusion (PBF) heat transfer. The PBF laser is very small, therefore, so too must be the FEM elements nearby the laser. For macroscopic parts, this produces meshes with unmanageably large amounts of nodes. The most straightforward resolution of this difficulty is allowing the mesh to be coarse far away from the laser. As the laser moves, the region of high mesh density moves along with it. This procedure, shown in FIGS. 5A-5D is called herein "adaptive meshing."

Example implementations of adaptive meshing are founded on pre-computing meshes for each time step of the simulation according to the predefined schedule of laser movements. In practice, the meshes for several time steps would be computed in advance, parallel to the rest of the computations.

Mathematically, this process requires modifying the discrete time-varying system:

$$x_k = A_d x_{k-1} + B_k u_k$$

$$y_k = C_k x_k \quad (14)$$

to the form:

$$x_k = A_k \Gamma_{k-1}^k x_{k-1} + B_k u_k$$

$$y_k = C_k x_k \quad (15)$$

In (15)-(16), the subscript "d" is dropped from discrete time-varying matrices A and B(t) to maintain notational conciseness. As a recap, $x_k \in \mathbb{R}^n$ is k is the FEM-discretized internal temperature distribution, $u_k \in \mathbb{R}^m$ stores time-varying parameters of the PBF laser, and $y_k \in \mathbb{R}^p$ stores the temperatures measured by every pixel of an infrared (IR) camera that has a moving field of view centered on the PBF laser. The dimension of $x_k$, $n_k$, is allowed to change with time because the adaptive mesh routine is programmed to target a desired mesh density, not a constant node count. Accordingly, the matrices $A_k$, $B_k$, and $C_k$ have non-constant size. The matrix $\Gamma_{k-1}^k$ interpolates the temperature field stored on the mesh at time step k−1 onto the new mesh at time step k. For each node i in mesh k, the relevant interpolation weights are calculated. The weights are collected into the relevant columns of row i of $\Gamma_{k-1}^k$. This is repeated for all $n_k$ nodes.

The LTI implementation of PBF heat transfer physics was not considered when constructing equation (15) because it would also become an LTV system. All that would change are the physical interpretations of the components of u(t) and y(t).

Implementing the EnKF with Adaptive Meshing

Incorporating equation (15) into the EnKF is done with a small modification to the state update equation. As before, let $X_{ens}=[x_k^1, x_k^2, \ldots, x_k^N]$ be the ensemble, which consists of N instances of equation (15) running in parallel. The modified algorithm is as follows:

$$X_{ens} = A_k \Gamma_{k-1}^k X_{ens} + B_k u_k 1_{1\times N} + W_k; \qquad (16)$$

$$W_k = [w_k^1, \ldots, w_k^N], w_k^j \sim \mathcal{N}(0, \sigma_w I_{n_k})$$

$$Y_{ens} = y_k 1_{1\times N} + V_k; V_k = [v_k^1, \ldots, v_k^N], v_k^j \sim \mathcal{N}(0, \sigma_v I_p)$$

$$\bar{x}_k = N^{-1} X_{ens} 1_{N\times 1}$$

$$\bar{y}_k = N^{-1} Y_{ens} 1_{N\times 1}$$

$$\bar{P}_k^f = \frac{1}{N-1}(X_{ens} - \bar{x}_k 1_{1\times N})(X_{ens} - \bar{x}_k 1_{1\times N})'$$

$$\bar{R}_k = \frac{1}{N-1}(Y_{ens} - \bar{y}_k 1_{1\times N})(Y_{ens} - \bar{y}_k 1_{1\times N})'$$

$$K_k = \bar{P}_k^f C_k' (C_k \bar{P}_k^f C_k' + \bar{R}_k)^\dagger$$

$$\hat{x}_{k|k} = N^{-1} X_{ens} 1_{N\times 1}$$

where $\sigma_w$ and $\sigma_v$ are hyperparameters governing the "trial guesses" for the process and measurement noise, and $y_k$ is the data from the IR camera. Here, $u_k$ either comes from a predetermined schedule of processing parameters, or in instances that use MPC, from the MPC computation of the previous time step. Only the first line needed to be modified. The rest of the algorithm proceeds as previously.

Implementing MPC with Adaptive Meshing

As with the EnKF, incorporating adaptive meshing into the MPC architecture is done via slight modifications to the LTV implementation of MPC discussed above. The modified optimization statement is as follows $$\min_{X,U} J = \sum_{j=1}^{n-1} \left( (x_{k+j} - r_{i+j})' Q_j (x_{k+j} - r_{i+j}) + u_{k+j}' T_j u_{k+j} \right) + \qquad (17)$$

$$\ldots (x_{k+N} - r_{k+\eta})' H (x_{k+\eta} - r_{k+\eta}) + u_{k+\eta}' T_\eta u_{k+\eta}$$

subject to $x_{k+j} = A_i \Gamma_{k-1}^k x_{k+j-1} + B_{k+j} u_{k+j} \forall j \in [1, \eta]$ $x_k = \hat{x}_{k|k}$ from EnKF $\underline{x} 1_{\eta_k \times 1} \leq x_{k+j} \leq \bar{x} 1_{\eta_k \times 1} \forall j \in [1, \eta]$ $u_{lb} \leq u_{k+j} \leq u_{ub} \forall j \in [1, \eta]$ X and U have the same meaning as above and the reference temperature field, $r_k$, has been mapped onto the adaptive mesh. The modifications include several points of bookkeeping: The matrices $Q_j$ and H have variable size due to the variable dimension $n_k$, and the constraints on $x_k$ have been rephrased. The upper bound is now $\bar{x} 1_{n_k \times 1}$, which reflects the fact that all components of $x_k$ share the same upper bound, and similarly for the lower bound. The statement of the convex-formulated MPC optimization problem also undergoes some minor modifications $$\min_\zeta J = \zeta' M \zeta + f \zeta \text{ subject to} \qquad (18)$$

$$D\zeta = b$$

$$G\zeta \leq e,$$

where $M = \text{diag}(\tilde{Q}, \tilde{T})$ $\tilde{Q} = \text{diag}(Q_1, Q_2, \ldots, Q_{\eta-1}, H)$ $\tilde{T} = \text{diag}(T_1, T_2, \ldots, T_\eta)$ $f = [f_X, 0_{1\times \eta m}]$ $f_X = -2[r_{k+1}' Q_1, r_{k+2}' Q_2, \ldots, r_{k+\eta-1}' Q_{\eta-1}, r_{k+\eta}' H]$ $D = [\tilde{A} \; \tilde{B}]$ $$\tilde{A} = \begin{bmatrix} I_{\eta k+1} & 0 & 0 & \ldots & 0 & 0 \\ -A_{k+2}\Gamma_{k+1}^{k+2} & I_{\eta k+2} & 0_n & \ldots & 0 & 0 \\ 0 & -A_{k+3}\Gamma_{k+2}^{k+3} & I_{\eta k+3} & \ldots & 0 & 0 \\ \vdots & \vdots & \vdots & \ddots & \vdots & \vdots \\ 0 & 0 & 0 & \ldots & -A_{k+\eta}\Gamma_{1+\eta-1}^{k+\eta} & I_{\eta k+\eta} \end{bmatrix} \bigg\} \eta \text{ blocks}$$

$\tilde{B} = \text{diag}(-B_{k+1}, -B_{k+2}, \ldots, -B_{k+\eta})$ $$b = \begin{bmatrix} A_{k+1}\Gamma_k^{k+1} \hat{x}_{k|k} \\ 0 \\ 0 \\ \vdots \\ 0 \end{bmatrix} \bigg\} \eta \text{ blocks}$$

$$G = \begin{bmatrix} I_{\eta(n+m)} \\ -I_{\eta(n+m)} \end{bmatrix}$$

$$e = \begin{bmatrix} \begin{pmatrix} X_{ub} \\ U_{ub} \end{pmatrix} \\ -\begin{pmatrix} X_{lb} \\ U_{lb} \end{pmatrix} \end{bmatrix}$$

$$X_{ub} = \begin{bmatrix} \bar{x} 1_{\eta k+1} \\ \bar{x} 1_{\eta k+1} \\ \vdots \\ \bar{x} 1_{\eta k+\eta} \end{bmatrix} \bigg\} \eta \text{ blocks}$$

$$U_{ub} = \begin{bmatrix} u_{ub} \\ u_{ub} \\ \vdots \\ u_{ub} \end{bmatrix} \bigg\} \eta \text{ blocks}$$

{similar for $X_{lb}$ and $U_{lb}$}

Figure 6:
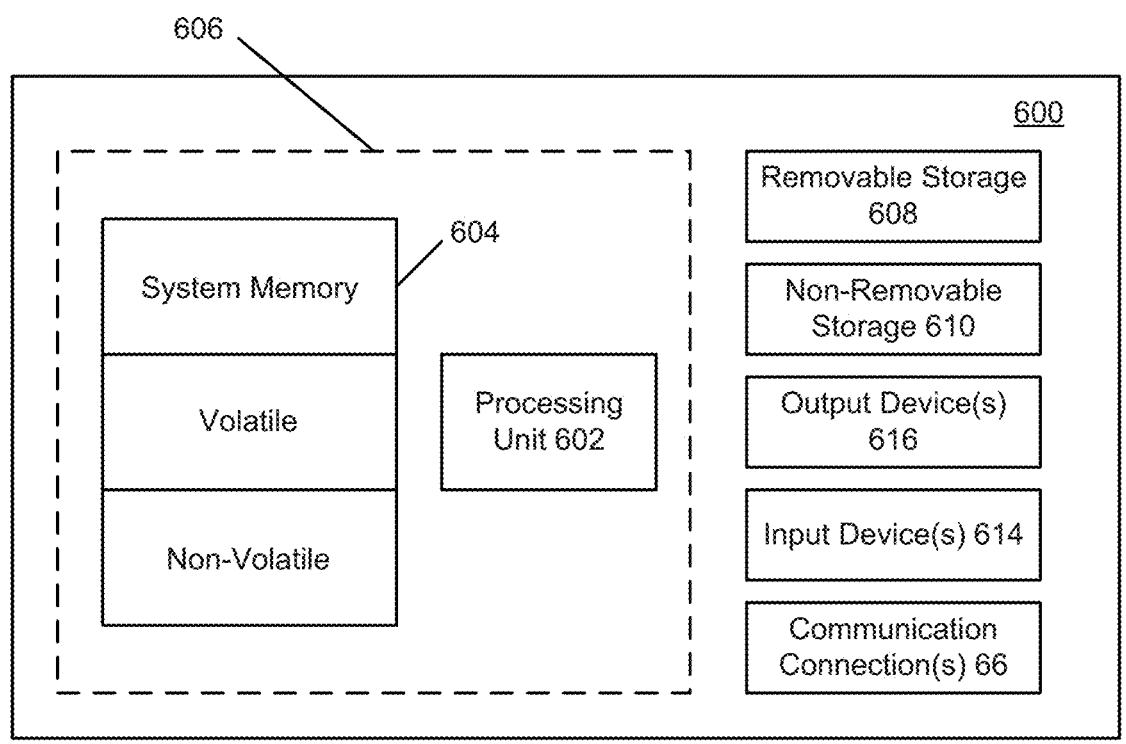
FIG. 6 shows an exemplary computing environment in which example embodiments and aspects may be implemented.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

In an implementation, a method of estimating the temperature distribution inside a part manufactured by powder bed fusion is provided. The method comprises: discretizing the part geometry into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; estimating the values of the variable set using a Kalman filter, using the set of ordinary differential equations, information on heat applied, an estimate of a noise distribution of the process, a measurement of a temperature of the part during the process at specific locations, and an estimate of a noise distribution in the temperature measurement; and outputting an estimate of the set of variables.

Implementations may include some or all of the following features. The method further comprises: reducing the number of ordinary differential equations in the set of ordinary differential equations via a change in variables of the ordinary differential equations as a linear combination of the set of variables, thus providing a transformed variable set prior to estimating the values of the transformed variable set; and prior to outputting the estimate of the set of variables, computing the estimate of the set of variables by reversing the reduction of the number of ordinary differential equations. The discretizing comprises a finite element method. The discretizing comprises a finite volume method. The discretizing comprises a boundary element method. The reducing comprises residualization. The reducing comprises balanced truncation.

In an implementation, a method of estimating the temperature distribution inside a part manufactured by powder bed fusion is provided. The method comprises: discretizing the part geometry into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; constructing a set of copies of the set of ordinary differential equations with independent application of input and measured noise distribution; estimating the values of the variable set and noise distributions of process and temperature measurement by using an ensemble Kalman filter, using the set of ordinary differential equations, information on the heat applied, and a measurement of a temperature of the part during the process at specific locations; and outputting an estimate of the set of variables.

In an implementation, a system for estimating the temperature distribution inside a part manufactured by powder bed fusion is provided. The system comprises: a processing module configured to: discretize a geometry of the part into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; estimate the values of the variable set using a Kalman filter, using the set of ordinary differential equations, information on heat applied, an estimate of a noise distribution of the process, a measurement of a temperature of the part during the process at specific locations, and an estimate of a noise distribution in the temperature measurement; and an output module configured to output an estimate of the set of variables.

Implementations may include some or all of the following features. The processing module is further configured to: reduce the number of ordinary differential equations in the set of ordinary differential equations via a change in variables of the ordinary differential equations as a linear combination of the set of variables, thus providing a transformed variable set prior to estimating the values of the transformed variable set, and prior to outputting the estimate of the set of variables, compute the estimate of the set of variables by reversing the reduction of the number of ordinary differential equations. The discretizing uses an adaptive mesh that changes over time. The discretizing comprises a finite element method or a finite volume method. The discretizing comprises a boundary element method. The reducing comprises one of residualization or balanced truncation.

As used herein, the singular form "a," "an," and "the" include plural references unless the context clearly dictates otherwise.

As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

It should be understood that the various techniques described herein may be implemented in connection with hardware components or software components or, where appropriate, with a combination of both. Illustrative types of hardware components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of estimating the temperature distribution inside a part manufactured by powder bed fusion process, the method comprising:
   discretizing the part geometry into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations;
   estimating the values of the variable set using a Kalman filter, using the set of ordinary differential equations, information on heat applied, an estimate of a noise distribution of the process, a measurement of a temperature of the part during the process at specific locations, and an estimate of a noise distribution in the temperature measurement; and
   pre-determining adaptive meshes for each time step according to a predefined schedule of laser movements of the power bed fusion process to move a region of high mesh density with the movements of the laser.

2. The method of claim 1, further comprising:
   storing time-varying parameters of the laser;
   storing the temperature measurement by every pixel of an infrared (IR) camera that has a moving field of view centered on the laser; and
   interpolating the temperature field stored on an adaptive mesh at time step k−1 onto the new mesh at time step k.

3. The method of claim 2, wherein each adaptive mesh has a target mesh density.

4. The method of claim 2, further comprising adjusting relative interpolation weights for each node in the adaptive mesh.

5. The method of claim 1, further comprising using Model Predictive Control (MPC) to alter control inputs to the powder bed fusion process.

6. The method of claim 3, further comprising mapping a reference temperature onto the adaptive mesh.

7. A system for estimating the temperature distribution inside a part manufactured by powder bed fusion, the system comprising:
   a processing module configured to:
   discretize the part geometry into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations;
   estimate the values of the variable set using a Kalman filter, using the set of ordinary differential equations, information on heat applied, an estimate of a noise distribution of the process, a measurement of a temperature of the part during the process at specific locations, and an estimate of a noise distribution in the temperature measurement; and
   pre-determine adaptive meshes for each time step according to a predefined schedule of laser movements of the power bed fusion process to move a region of high mesh density with the movements of the laser.

8. The system of claim 7, the processing module further configured to:
   store time-varying parameters of the laser;
   store the temperature measurement by every pixel of an infrared (IR) camera that has a move field of view centered on the laser; and
   interpolate the temperature field stored on an adaptive mesh at time step k−1 onto the new mesh at time step k.

9. The system of claim 8, wherein each adaptive mesh has a target mesh density.

10. The system of claim 8, the processing module further configured to adjust relative interpolation weights for each node in the adaptive mesh.

11. The system of claim 7, the processing module further configured to using Model Predictive Control (MPC) to alter control inputs to the powder bed fusion process.

12. The system of claim 9, the processing module further configured to map a reference temperature onto the adaptive mesh.

* * * * *